United States Patent
De Mattia

(10) Patent No.: US 8,999,096 B2
(45) Date of Patent: Apr. 7, 2015

(54) METHOD FOR MANUFACTURING A COMPOSITE MATERIAL CURVED PART, AND DEVICE FOR MANUFACTURING A COMPOSITE MATERIAL CURVED PART

(75) Inventor: Denis De Mattia, Basse Goulaine (FR)

(73) Assignee: Airbus Operations S.A.S., Toulouse (FR)

( * ) Notice: Subject to any disclaimer, the term of this patent is extended or adjusted under 35 U.S.C. 154(b) by 442 days.

(21) Appl. No.: 13/510,399

(22) PCT Filed: Nov. 4, 2010

(86) PCT No.: PCT/FR2010/052379
§ 371 (c)(1),
(2), (4) Date: Aug. 30, 2012

(87) PCT Pub. No.: WO2011/061432
PCT Pub. Date: May 26, 2011

(65) Prior Publication Data
US 2012/0312459 A1    Dec. 13, 2012

(30) Foreign Application Priority Data
Nov. 19, 2009   (FR) ..................................... 09 58198

(51) Int. Cl.
*B29C 53/04*    (2006.01)
*B29C 70/56*    (2006.01)
*B29C 70/30*    (2006.01)
*B29L 9/00*    (2006.01)

(52) U.S. Cl.
CPC ........... *B29C 70/30* (2013.01); *Y10T 156/1028* (2015.01); *B29C 53/04* (2013.01); *B29C 70/56* (2013.01); *B29L 2009/00* (2013.01)

(58) Field of Classification Search
None
See application file for complete search history.

(56) References Cited

U.S. PATENT DOCUMENTS

| | | | | |
|---|---|---|---|---|
| 4,744,846 A | * | 5/1988 | Pflug et al. | 156/212 |
| 4,777,005 A | | 10/1988 | Miller | |
| 5,344,602 A | * | 9/1994 | Yencho | 264/258 |
| 5,348,602 A | | 9/1994 | Makarenko et al. | |

OTHER PUBLICATIONS

International Search Report Issued Mar. 14, 2011 in PCT/FR10/52379 Filed Nov. 4, 2010.

* cited by examiner

*Primary Examiner* — Barbara J Musser
(74) *Attorney, Agent, or Firm* — Oblon, McClelland, Maier & Neustadt, L.L.P.

(57) ABSTRACT

A process for manufacturing a curved part of composite material, during which the layers of fibers of composite materials that will compose the part are held taut at least during the bending step, and displacement of the layers with relation to each other is controlled, is disclosed. A device capable of implementing this type of processss is also disclosed.

10 Claims, 1 Drawing Sheet

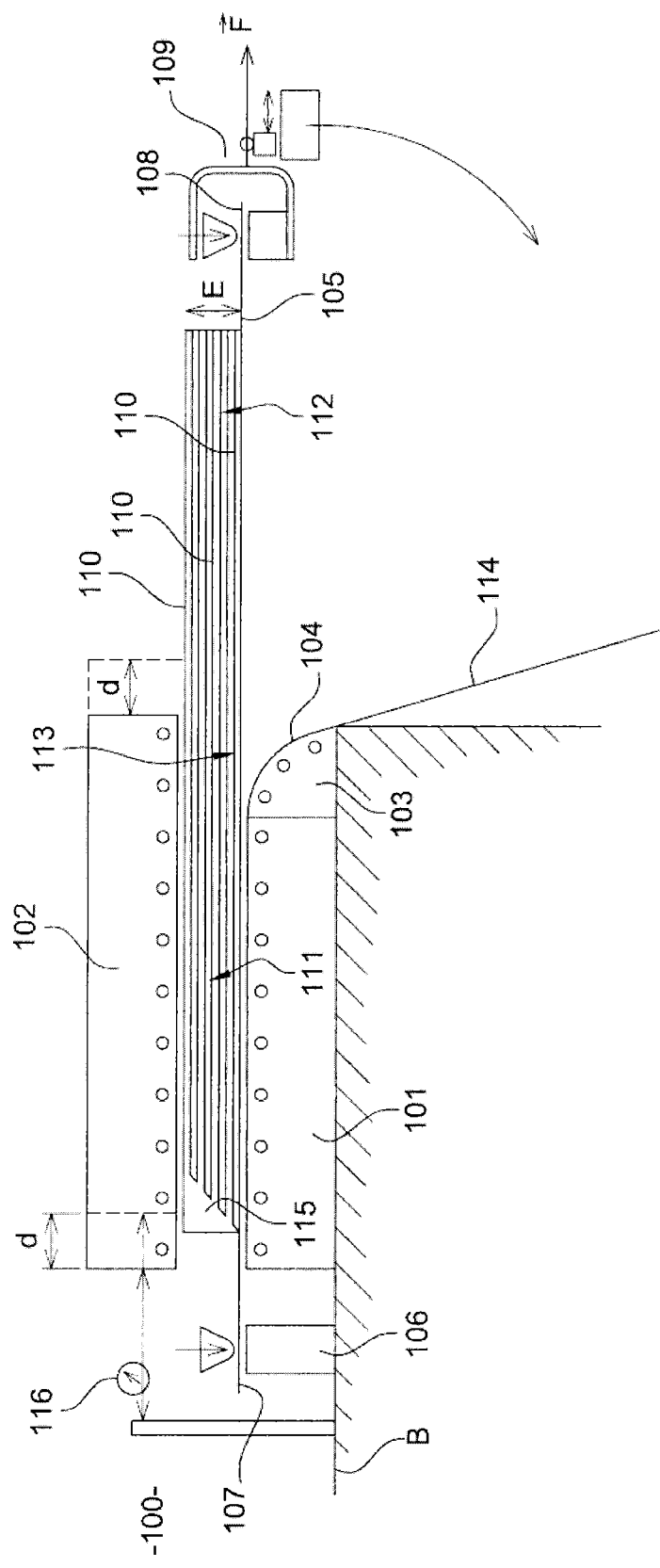

METHOD FOR MANUFACTURING A COMPOSITE MATERIAL CURVED PART, AND DEVICE FOR MANUFACTURING A COMPOSITE MATERIAL CURVED PART

BACKGROUND OF THE INVENTION

1. Field of the Invention

The invention concerns a process for manufacturing a curved part made of composite material, as well as a device to be used in the manufacture of such a curved part of composite material that can be used to implement the process according to the invention. The invention particularly concerns parts made of stratified composite material comprising layers of reinforcing fibers immersed in a heat curable polymer resin.

The invention will be applicable in the field of aeronautics for the manufacture of relatively thick aircraft parts, i.e. in the range of 10 to 25 mm, such as angle brackets, spars, wing surface and fuselage components, etc.

2. Description of the Related Art

At present, in order to make a part with a local radius of curvature from a composite material, a known process entails draping fiber strips of a composite material directly onto a molding preform with the desired radius of curvature, so as to obtain the desired curved part when the substance cures. However, this manufacturing method is unsatisfactory, primarily from the production perspective.

Another known heat bending system is used to make aircraft angle brackets and the folded edge of upper panels. Nonetheless, this bending device cannot be used to obtain stretched fibers in each section of the part after polymerization, and notably with regard to the radius of curvature. In the first place, bending causes crimping of compressed fibers in the internal radius of a part and in the second place, autoclave pressure forming does not always suffice for offsetting insufficient fiber lengths due to shrinkage of the part during polymerization.

Thus, ripples in the fibers can be observed in the internal radius of the finished part corresponding to excessive fiber length resulting from crimping of creases in compressed composite materials. In addition, the final part may display porosity due to improper compaction by autoclave pressure, especially in the radius area, due to insufficient fiber lengths during the shrinking process.

BRIEF SUMMARY OF THE INVENTION

Consequently, in the invention we are proposing a manufacturing process for a curved part of composite material, as well as a device for making a curved part in composite material, that does not present all or part of the above-mentioned drawbacks. In particular, we seek to be able to make a curved part of composite material with the required lengths of fibers throughout the part, so as to avoid excessively or insufficiently long fibers in the internal and/or external radii, regardless of the radius of the desired curve.

To achieve this, in the invention we propose maintaining the internal surface of the piece to be bent under tensile pressure during the bending phase so as to eliminate, or at any rate to limit, the formation of crimps in the radius of curvature, especially at the level of the internal radius. Therefore, according to the invention, pre-impregnated layers of fiber composite material fibers not yet cured are laid on a plate, such as a fiberglass plate, or on a layer of composite material capable of sustaining tensile stress, which is maintained taut during the bending phase. The layers of fibers of composite materials are also kept under tensile pressure during the bending phase. It is also proposed to control the movement of fiber layers of composite material, simultaneously or not, so as to obtain just the degree of slide necessary to produce the required fiber lengths throughout the entire thickness of the finished part. As an example, the layers of fibers are held between two heating/cooling plates, with the upper plate in contact with the outermost layer of composite material fibers and capable of sliding at the same time as the layer of fibers, so as to accompany the movement. Here, the outermost layer is that layer located where the external future radius of the part will be. Thus when the layers have all moved sufficiently with relation to each other, which will be easily discernible by assessing the displacement of the upper plate, the layers are set with relation to each other by local cooling of the part to stop any forward movement of the layers. Naturally, it is possible to set up another visual benchmark or another means of evaluating movement of the upper plate in order to assess how much the composite material layers have slid, for example, by means of a sensor. The resin in the layers of composite material fibers liquefies as a result of raising the temperature to around 80° C., allowing sliding of all the layers with relation to the others as the bending advances progressively, so that the material will bend without stretching the outermost layers. The outermost layer is the one that moves the most, whereas the position of the innermost layer remains almost unchanged. Furthermore, with the internal layers well tautened and each layer moving the distance required to ensure the necessary fiber lengths for attaining the radius of curvature, the resulting curved part presents a smooth appearance, devoid of ripples or crimps.

The object of the invention is therefore a manufacturing process for a curved part of composite material, characterized in that it comprises the following steps:

A group of layers of composite material fiber is laid out flat on a support layer The support layer with the layers of fibers of composite material are placed between two plates, respectively the upper plate and the lower plate, with the lower plate having a preform placed adjacent to it presenting a radius of curvature corresponding to the internal radius of curvature desired for the part being manufactured The support layer is tightened The support layer, along with the layers of composite material fiber is heated The support layer and the layers of composite material fibers are bent, taking care to measure the sliding of the layers of composite material fibers with relation to each other and with relation to the lower plate Bending of the layers is stopped once the composite material fibers have slid sufficiently to attain the desired radius of curvature.

The support layer may be a plate upon which the successive layers of composite material are resting, or a single layer of the composite material—provided that it can sustain the tensile force exerted on it during the process according to the invention—that will then form the internal layer of the final curved part.

Once the desired radius of curvature is obtained, the curved piece can be advantageously cooled in order to avoid the beginning of polymerization. As an example, the curved piece may be cooled by subjecting it to a temperature lower to its temperature when it emerges from the forming step. Otherwise, it is possible to allow the said curved piece cool of its own accord, little by little, simply by removing the heat source from the piece once it has been completely formed.

In a particular implementation mode, the upper plate is laid out such that it rests on the composite material fibers and is able to shift with relation to the lower plate at the same time as the layers of composite material fibers. The movement of the composite material fibers is assessed during the bending stage by measuring the movement of the upper plate with relation to the lower plate, or with relation to the support layer, which also remains stationary with relation to the other composite material fiber layers.

Otherwise, it is possible to use a fixed upper plate that does not rest on the composite material fiber layers, with a means for evaluating the movement of the fiber layer, such as a sensor, available to the user for determining when the shifting of composite material fiber layers is sufficient and that the desired curvature radius has been obtained.

The heating and subsequent cooling of the support layer with the composite material fiber layers is done advantageously by means of lower and/or upper plates and/or the preform, which are then heating/cooling plates and preform. Naturally, any other means of heating and cooling can be considered.

The support layer will preferably have dimensions clearly greater than the dimensions of the composite material fiber layer that it supports.

According to a particular embodiment of the invention, it is possible to break down the bending step of the process in the following manner:
  A pre-bending step is carried out once the portion of the support layer with layers of composite material fibers is heated between the two plates, keeping the support layer taut until the desired amount of sliding has been attained by the upper plate
  The said portion is cooled in such a way that only the area intended to feature a radius of curvature remains hot
  Bending of the composite material part is continued until the desired angle is achieved Thus once it has been determined that the layers of composite material fibers have been moved sufficiently, the part is cooled to prevent any additional sliding, with only the area intended for curvature being maintained at a high temperature to allow continued bending. It is then no longer necessary to keep the support layer taut during this second phase of bending. During the pre-bending phase, when the layers could slide, maintaining tension kept the internal layers under tensile pressure, and during the final bending phase the layers were again fixed with relation to each other.

It is preferable to continue the pending process until the bend comes up against a mold set at the desired angle and that extends down from the preform.

Advantageously, the amount of movement of the upper plate with relation to the lower plate required to obtain the radius of curvature desired is determined prior to the bending step. For example, we select a displacement of the upper plate with regard to the lower plate that is equal to the final angle desired of the radius of curvature of the part made of composite material, multiplied by the thickness of the said part after curing.

During bending, the portions of the part made from composite material can be subjected to a temperature of between 60° and 100° C., and for cooling, between 80° C. and +/−10° C.

Advantageously, the cooling of all or part of the said part consists in bringing the said part or portion of the part to a temperature between 10 and 40° C., and preferably to a temperature between 20° C.+/−10°.

The composite material fiber layers are often composed of carbon fiber layers.

The support layer is commonly a fiberglass film. For bending to occur, the point of traction on the support layer is moved in the direction of the bend.

It is preferable to cure the composite material part once the bending is completed and the curved part has cooled. Curing is done using a convex or concave unit covered by a bladder to achieve autoclave polymerization. During the polymerization step, the part will shrink, thus shedding around 15% of its thickness. It is important to account for this phenomenon while making the part, especially when choosing the radius of curvature of the preform in the hot bending phase, as a function of the final angle desired for the said part. With the process according to the invention, after shrinking, the fibers in the composite material part are taut, especially in the curved area and feature no or few seams.

The invention also concerns a device for manufacturing a curved part of composite material, characterized in that it comprises
  A lower plate
  An upper plate
  A preform with a radius of curvature, the said preform extending past the lower plate
  A support layer intended to be inserted at least partially between the two plates and to receive the successive layers of composite fiber material used for manufacturing the curved piece
  A traction system capable of maintaining tension on the support layer, and
  A system for measuring movement of the composite material layers with relation to the lower plate and/or the support layer.

In a particular embodiment of the device for manufacturing a curved part of composite material according to the invention, the upper plate is able to rest on the layers of composite material fibers and to move at the same time they do, with the measuring system evaluating the displacement of the upper plate with relation to the lower plate.

It is then preferable that the device according to the invention also comprise a means of measuring the displacement of the upper plate with relation to the lower plate, or with relation to the support layer, in order to be able to control bending in accordance with the previously determined plate movement data, and to properly adjust the displacement of the said plate with relation to the final angle desired for the composite material part.

Advantageously, the upper plate and/or the lower plate and/or the preform can heat and cool the materials.

Advantageously, the weight of the upper plate shall be offset in part through mechanical balancing.

The preform shall advantageously have a radius of curvature in relation with the internal radius of curvature desired for the part being manufactured. More accurately, the difference between the two radii of curvature is theoretically equal to the shrinking coefficient that increases the difference in thicknesses of the part before and after curing.

The traction system makes it possible to exert force uniformly during the bending phase over the entire dimension of the part to be curved.

BRIEF DESCRIPTION OF THE DRAWINGS

The invention will be better understood upon reading the following description and reviewing the accompanying drawing. These are included as an example and in no way limit the invention.

The sole drawing schematically represents a device according to the invention for manufacturing a curved part using composite material.

DETAILED DESCRIPTION OF THE INVENTION

As can be seen in the drawing, the device 100 according to the invention comprises a lower heating/cooling plate 101 mounted on a fixed structure B and an upper heating/cooling plate 102.

A preform 103 is mounted adjacent to the lower heating/cooling plate 101, more precisely as an extension of the said plate 101. The preform 103 features a radius of curvature 104 corresponding to the internal curvature radius desired before polymerization for the part being manufactured.

A support layer 105, of fiberglass for example, is set out above the lower plate 101 and part of it is inserted between the two plates 101, 102. The support layer 105 is clamped on a first end 107 onto the clamping base 106, while a second end 108 opposite of the first end 107, is clamped onto a traction system 109 that will exert a constant traction force F onto said support layer 105. The support layer 105 is held flat through a traction force exerted by the traction system 109.

Layers of carbon fibers 110, or draped layers, of dimensions smaller than those of the support layer 105, are draped onto and compacted against the support layer 105. Thus the draped layers 110 rest entirely on the support layer 105. The successive layers of composite material fibers 110 are arrayed so as to present a front portion 111 sandwiched between the two plates 101, 102 and a rear portion 112 extending beyond the said plates 101, 102, with the area to be curved coinciding with the preform 103.

The radius of curvature 104 for the preform 103 is selected so that it corresponds to the radius of curvature of the polymerization unit that will be subsequently employed, less the thickness E of the draped layers 110.

The upper heating/cooling plate 102 rests on the outermost layer of composite material fibers 110, with the weight of said upper heating/cooling plate offset by a counter weight system, not shown in the drawing.

Temperatures of up to 80° C. are applied to the front portion 111 of the draped layers 110 by means of the two heating/cooling plates 101, 102 and the preform 103 between which the layers are laid.

Heat bending of the said draped layers 110 is then begun, with simultaneous application of a constant traction force F onto the support layer 105, with the traction point displacing toward the direction of bending. The point of traction naturally follows a trajectory involute to a circle if the preform 103 has a constant radius of curvature 104. To the extent that the entire support layer 105 is held in traction during this first bending phase, the resulting curved part will have no crimped fibers, especially along the internal radius.

The front portion 111 of the draped layers 110 will preferably be cooled to 20° C., still using the heating/cooling plates 101, 102 when the relative displacement d of the upper plate 102 with relation to the lower plate 101 is equal to the angle in radians of the part desired when the curing process is completed, multiplied by the thickness of the part after curing, i.e. after shrinking of 15%. The displacement of the upper plate 102 can be measured by a supplemental measuring device 116. Cooling of the resin will result in the draped layers 110 hardening one after the other. Only the intermediate portion 113 of the draped layers 110 located at the preform 103 is kept heated at 80° C., by the said preform 103. The front most portion of the draped layers 110 are then all displaced in accordance with the distance required to ensure sufficiently long fiber lengths in the radius of curvature of the part, even though the final desired angle of the curved portion of the part has not yet been achieved. Sliding 115 of the front portion 111 of the layers 110 is represented in the single drawing by a cut section or beveled edge at the extreme left end of the draped layers 110. The outermost layer 110 upon which the upper plate 102 rests is that which will have slid the most to follow the rocking movement of the traction system, with the innermost layer 110 in direct contact with the support layer 105 having remained stationary.

The bending is then continued at the middle part 113 of the draped layers 110 against a flat surface 114 extending down from the radius of curvature 104 of the preform 103. This second bending phase does not require that the support layer 105 be maintained in traction.

The middle portion of the curved part 113 is then cooled to a temperature of around 20° degrees C.

It is then possible to remove the resulting part from the mold in order to place it, for example, in a concave polymerization unit for curing and to obtain the final curved part with the desired/pre-determined dimensions. The curved area therefore contains, prior to curing, a reserve in fiber lengths, which can be used to compensate for loss of fiber length resulting from shrinkage of the material during the autoclave polymerization cycle. This reserve of fiber lengths resulting from second bending phase could have accumulated, for example, in the hollowed out areas occurring in the preform 103.

The invention claimed is:

1. A manufacturing process for a curved part of composite material, comprising:
   laying out a group of composite material fiber layers flat onto a support layer;
   placing the support layer together with the layers of composite material fibers between two plates, respectively an upper plate and a lower plate, with the lower plate adjacent to a preform presenting a curvature radius corresponding to an internal curvature radius desired for the part being manufactured;
   placing the support layer under tension;
   heating the support layer along with the layers of composite material fibers;
   bending the support layer and the layers of composite material fibers; measuring a sliding of the layers of composite material fibers with relation to each other; and
   stopping the bending of the layers when the composite material fibers have slid sufficiently to attain a desired angle.

2. The manufacturing process for a curved part of composite material according to claim 1, further comprising:
   laying out the upper plate so that the upper plate rests on the composite material fibers and is able to shift with relation to the lower plate at the same time as the layers of composite material fibers;
   evaluating the sliding of the layers of composite material fibers during the bending process by measuring movement of the upper plate with relation to at least one of the support layer or the lower plate.

3. The manufacturing process for a curved part of composite material according to claims 1 or 2, wherein
   the heating of the support layer with the composite material fiber layers is done by means of at least one of the upper plate, the lower plate, or the preform, which are heating/cooling elements.

4. The manufacturing process for a curved part of composite material according to claim 2, further comprising:

performing a pre-bending step once the support layer together with layers of composite material fibers is heated, keeping the support layer taut until a desired extent of displacement of the upper plate has been achieved;

cooling the support layer together with layers of composite material fibers such that only an area intended to feature a radius of curvature remains hot;

continuing bending of the part composed of composite material until the desired angle is achieved.

5. The manufacturing process for a curved part of composite material according to claim 2, further comprising:

measuring a displacement (d) of the upper plate with regard to at least one of the lower plate or the support layer so that the displacement (d) is equal to a final angle desired of the radius of curvature of the part made of composite material multiplied by a thickness (E) of the part.

6. The manufacturing process for a curved part of composite material according to claim 1, further comprising:

cooling the resulting curved part.

7. The manufacturing process for a curved part of composite material according to claim 1, further comprising:

heating, for bending, the support layer together with the layers of fiber of composite material to a temperature of 80° C., +/−10° C., and subsequently cooling to 20° C., +/−10° C. following bending.

8. A device for manufacturing a curved part of composite material, comprising:

a lower plate;

an upper plate;

a preform with a radius of curvature, the preform extending beyond an edge of the lower plate;

a support layer intended to extend at least partially over the upper and lower plates and to receive successive layers of composite fiber material used for manufacturing the curved piece;

a traction system capable of maintaining the support layer under tension; and a system for measuring movement of the layers of composite fiber material with relation to the at least one of support layer or the lower plate.

9. The device for manufacturing a curved part of composite material according to claim 8, wherein the upper plate is able to rest on the layers of composite fiber material and to move at the same time as the layers of composite fiber material, with the measuring system evaluating a displacement (d) of the upper plate with relation to at least one of the support layer or the lower plate.

10. The device for manufacturing a curved part of composite material according to claims 8 or 9, wherein at least one of the upper plate, the lower plate, or the preform is a heating/cooling element.

* * * * *